United States Patent
Chiba (10) Patent No.: US 9,201,616 B2
(45) Date of Patent: Dec. 1, 2015

(54) IMAGE COMMUNICATION APPARATUS, METHOD AND STORAGE MEDIUM WITH ARCHIVING FUNCTION

(71) Applicant: CANON KABUSHIKI KAISHA, Tokyo (JP)

(72) Inventor: Shinichi Chiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/556,586

(22) Filed: Dec. 1, 2014

(65) Prior Publication Data

US 2015/0169268 A1 Jun. 18, 2015

(30) Foreign Application Priority Data

Dec. 16, 2013 (JP) .................................. 2013-259505

(51) Int. Cl.
*G06F 3/12* (2006.01)
(52) U.S. Cl.
CPC ............ *G06F 3/1234* (2013.01); *G06F 3/1238* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 7,301,658 | B2* | 11/2007 | Henry | 358/1.15 |
| 7,313,699 | B2* | 12/2007 | Koga | 713/170 |
| 8,248,642 | B2* | 8/2012 | Umetsu | 358/1.15 |
| 8,312,274 | B2* | 11/2012 | Matsumoto et al. | 713/170 |
| 2008/0112022 | A1* | 5/2008 | Masao | 358/506 |
| 2011/0157618 | A1 | 6/2011 | Odaira | 358/1.14 |
| 2014/0153050 | A1* | 6/2014 | Enomoto | 358/1.16 |

FOREIGN PATENT DOCUMENTS

JP 2011-139272 A 7/2011

* cited by examiner

*Primary Examiner* — Paul F Payer
(74) *Attorney, Agent, or Firm* — Fitzpatrick, Cella, Harper & Scinto (57) ABSTRACT

There is provided with an image communication apparatus. A designation unit designates a destination of image data. A transmission unit transmits the image data to the destination designated by the designation unit. A determination unit determines whether or not transmission by the transmission unit has been performed successfully. An archiving unit transmits, when it is determined that transmission by the transmission unit has been performed successfully, the image data to an archiving destination. A storage unit stores, when archiving of the image data by the archiving unit fails, the image data securely such that a user who has an administrative right can output the image data.

10 Claims, 8 Drawing Sheets

FIG. 8

IMAGE COMMUNICATION APPARATUS, METHOD AND STORAGE MEDIUM WITH ARCHIVING FUNCTION

BACKGROUND OF THE INVENTION

1. Field of the Invention

The present invention relates to an image communication apparatus, an image communication method, and a storage medium.

2. Description of the Related Art

An image communication apparatus that automatically transits image data to an archiving destination (specific destination for an administrator) for the purpose of inhibiting leakage and abuse of the transmitted image data is conventionally known. Furthermore, an image communication apparatus that, in order to more reliably transmit image data to an archiving destination, first transmits image data to the archiving destination, and controls transmission of the image data based on whether or not the transmission of the image data to the archiving destination has been successfully performed (see, for example, Japanese Patent Laid-Open No. 2011-139272).

SUMMARY OF THE INVENTION

According to an embodiment, an image communication apparatus comprises: a designation unit constructed to designate a destination of image data; a transmission unit constructed to transmit the image data to the destination designated by the designation unit; a determination unit constructed to determine whether or not transmission by the transmission unit has been performed successfully; an archiving unit constructed to, when it is determined that transmission by the transmission unit has been performed successfully, transmit the image data to an archiving destination; and a storage unit constructed to, when archiving of the image data by the archiving unit fails, store the image data securely such that a user who has an administrative right can output the image data.

According to another embodiment, an image communication apparatus comprises: a designation unit constructed to designate a destination of image data; a transmission unit constructed to transmit the image data to the destination designated by the designation unit; a determination unit constructed to determine whether or not transmission by the transmission unit has been performed successfully; an archiving unit constructed to, when it is determined that transmission by the transmission unit has been performed successfully, transmit the image data to an archiving destination; and a setting unit constructed to configure a setting that is used when archiving of the image data by the archiving unit fails; and a storage unit constructed to, when archiving of the image data by the archiving unit has failed and the setting has been configured by the setting unit, store the image data in accordance with the setting configured by the setting unit.

According to still another embodiment, an image communication method comprises: transmitting an image data to a designated destination; determining whether or not the transmission of the image data to the designated destination has been performed successfully; transmitting the image data to an archiving destination when it is determined that the transmission of the image data has been performed successfully; and storing the image data securely such that a user who has an administrative right can output the image data, when the transmission of the image data to the archiving destination fails.

According to yet another embodiment, a non-transitory computer-readable medium stores a program to cause a computer to: transmit an image data to a designated destination; determine whether or not the transmission of the image data to the designated destination has been performed successfully; transmit the image data to an archiving destination when it is determined that the transmission of the image data has been performed successfully; and store the image data securely such that a user who has an administrative right can output the image data, when the transmission of the image data to the archiving destination fails.

Further features of the present invention will become apparent from the following description of exemplary embodiments (with reference to the attached drawings).

DESCRIPTION OF THE EMBODIMENTS

Conventional image communication apparatuses that determine whether to transmit image data to a designated destination based on whether or not the image data has been successfully transmitted to an archiving destination are inconvenient for users. For example, in the case where the administrative right is required to correct a cause of failure in archiving such as making a setting for the server, a general user who does not have the right cannot use the image data transmission function until the cause is cleared. In addition, in a configuration in which archiving transmission is always executed first, unnecessary archiving occurs if transmission of image data to a designated destination, which is subsequently executed, ends in failure.

According to an embodiment, archiving is executed if transmission of image data is performed successfully, and processing that is performed if archiving fails can be set. According to such an embodiment as described above, it is possible to improve usability for general users while implementing the archiving function.

Hereinafter, embodiments of the present invention will be described in detail with reference to the accompanying drawings. It is to be noted that the following embodiments are not intended to limit the present invention defined in the appended claims, and that not all of the combinations of features described in the embodiments are necessarily essential with respect to the means to solve the problems according to the present invention.

Figure 1:
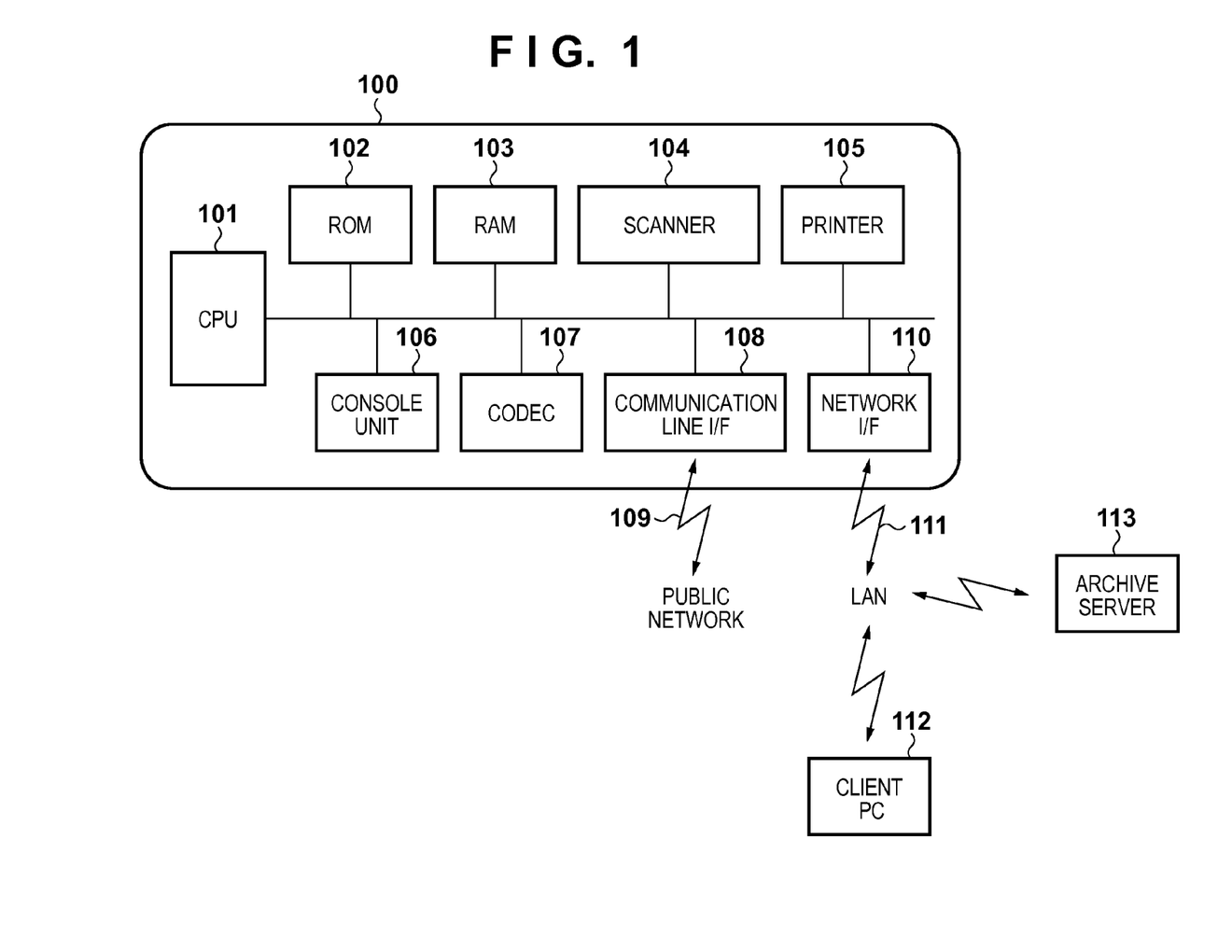
FIG. 1 is a block diagram illustrating a configuration of an image communication apparatus according to Embodiment 1 of the present invention.

FIG. 1 is a block diagram illustrating a configuration of an image communication apparatus according to Embodiment 1 of the present invention.

An image communication apparatus 100 includes a CPU 101, a ROM 102, a RAM 103, a scanner 104, a printer 105, a console unit 106, a CODEC (coding/decoding unit) 107, a communication line I/F 108, and a network I/F 110.

The CPU 101 is a microprocessor, and is configured to control overall operations of the image communication apparatus 100. The ROM 102 stores therein a control program executed by the CPU 101. The control program is a control program executed by the CPU 101 described in the embodiments given below. The ROM 102 is, for example, a rewritable flash ROM or the like, and is used to store programs executed by the CPU 101, setting values registered by users of the image communication apparatus 100, management data and the like. Data input by secure printing, which will be described later, is also stored in the ROM 102. The RAM 103 is used to load a program executed by the CPU 101, and the CPU 101 executes the program loaded from the ROM 102 into the RAM 103. The RAM 103 is also used as a work memory that stores various types of data during execution of the program by the CPU 101, and is used to store programs, program control variables, some of the setting values registered by the users of the image communication apparatus 100, management data and the like. The scanner 104 includes a CS image sensor, an original feeding mechanism and the like, and is configured to optically read an original and output electric image data. The printer 105 prints received image data or file data onto recording paper.

The console unit 106 includes a keyboard, a touch panel, a display, an LED and the like, and is configured to receive various types of operations from a user, provides a notification to the user via an operation screen displayed on the display, and receive an instruction from the user. The CODEC 107 is a module that performs encoding and decoding such as JBIG or JPEG, and is configured to execute compression and decompression processing of image data according to a prescribed standard. The communication line I/F 108 includes a modem (modular/demodulator), an NCU (network control unit) and the like, and is configured to perform fax transmission and reception via a public network 109. The network I/F 110 performs SMB transmission, FTP transmission and the like via a network (LAN) 111 or the like. The network I/F 110 also receives a secure printing job from a client PC 112. The secure printing job refers to a print job that, as a result of a user setting a password when submitting the job, and inputting the password into the image communication apparatus 100, causes the image communication apparatus 100 to execute the job of printing. Furthermore, when archiving is performed by transmitting the image data to the archiving destination, communication processing is performed to perform communication with an archive server 113.

Figure 2:
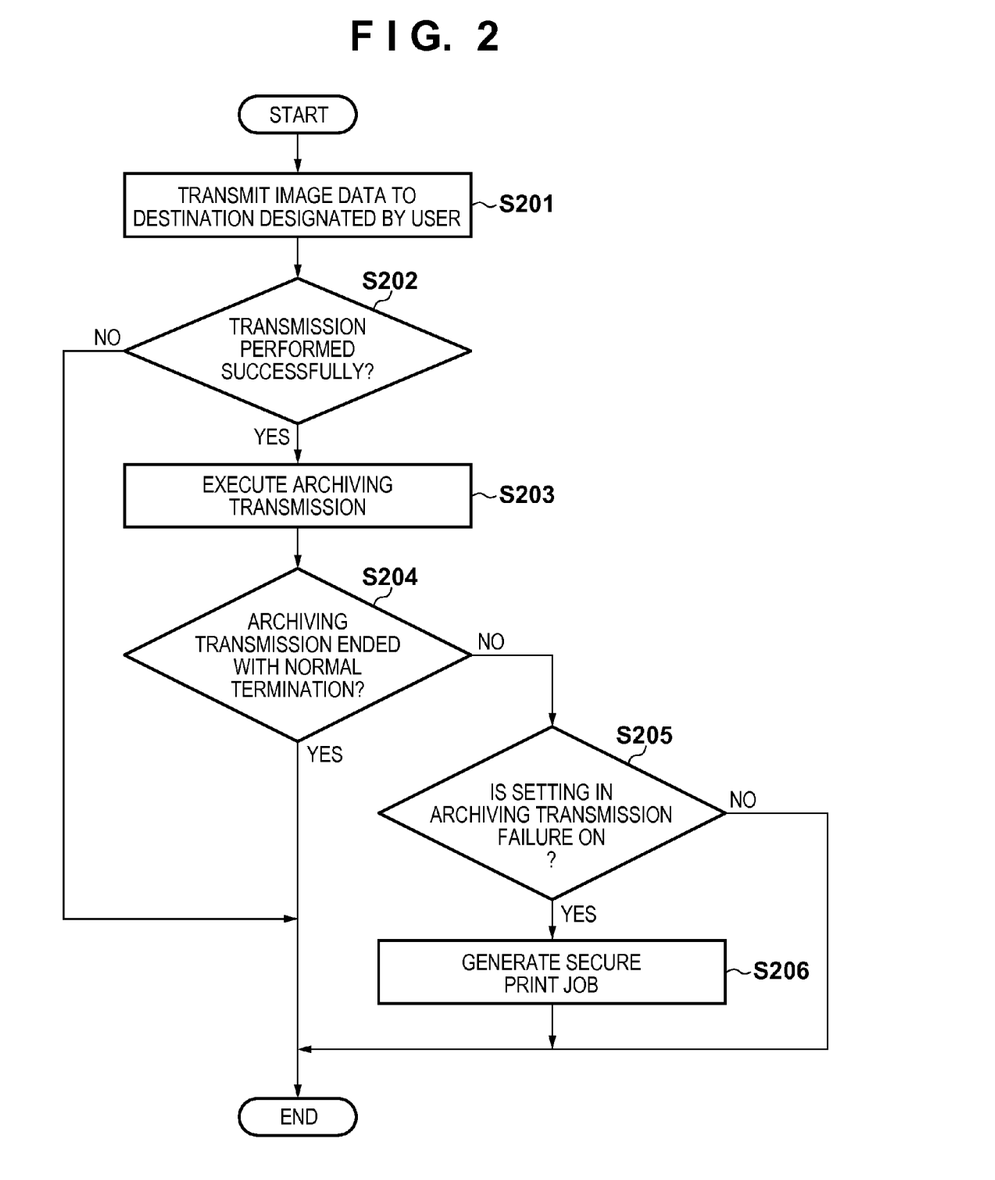
FIG. 2 is a flowchart illustrating processing for storing an archive transmission job performed by the image communication apparatus according to Embodiment 1 of the present invention.

FIG. 2 is a flowchart illustrating processing for storing an archive transmission job performed by the image communication apparatus 100 according to Embodiment 1 of the present invention. A program that executes this processing is stored in the ROM 102, loaded into the RAM 103 when executing the program, and executed under control of the CPU 101.

First, in S201, the CPU 101 transmits image data to a destination designated by a user. Next, in S202, the CPU 101 determines whether or not the transmission of the image data has been successfully performed. If it is determined that the transmission of the image data has failed, the processing ends. If it is determined in S202 that the transmission of the image data has been successfully performed, the procedure advances to S203, where the CPU 101 transmits the image data to an archive destination set by an administrator for the purpose of storing the transmitted image data. Here, for example, the image data is transmitted to the archive server 113. Next, in S204, the CPU 101 determines whether or not the archiving transmission ended with normal termination. If it is determined that the archiving transmission ended with normal termination, the processing ends. If, on the other hand, it is determined in S204 that the archiving transmission did not end with normal termination, the procedure advances to S205, where the CPU 101 determines the next operation in accordance with the setting in archiving transmission failure. If the CPU 101 determines in S205 that the setting in archiving transmission failure is on, the procedure advances to S206, where the CPU 101 generates a secure print job as described above by using the image data that was designated to be transmitted through archiving transmission. Then, the processing ends. In S206, the CPU 101 sets a pre-set administrator password as an unlock password for the generated secure print job.

As described above, if archiving transmission fails, the image data is stored in such a manner that only a user who knows the administrator password can output the image data.

Figure 3:
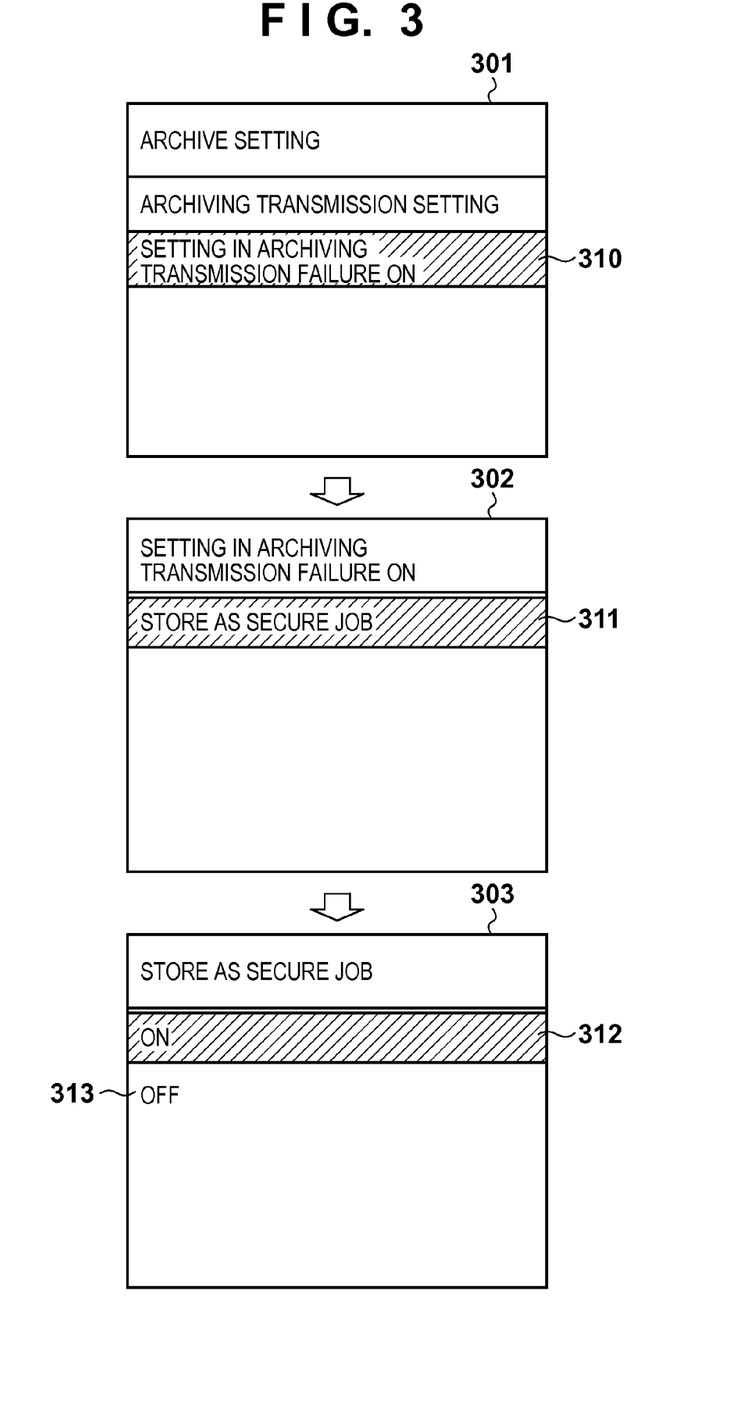
FIG. 3 is a diagram illustrating setting screens displayed when an archive transmission job is stored according to Embodiment 1 of the present invention.

FIG. 3 is a diagram illustrating setting screens displayed when an archive transmission job is stored according to Embodiment 1 of the present invention. The setting screens shown in FIG. 3 are screens that are not displayed unless the aforementioned administrator password is not input.

Upon selection of "system administrator's settings" on a menu screen (not shown), input of an administrator ID and password is requested. If "archive setting" on the screen is selected by a user who has the administrative right, an archive setting screen 301 is displayed. On the archive setting screen 301, the user selects "setting in archiving transmission failure" 310. Upon selection of the item, the screen transitions to a screen 302 for making a setting in archiving transmission failure. On the setting screen 302, the user selects "store as secure job" 311. Upon selection of the item, the screen transitions to a screen 303 for storing the image data as a secure job. On that screen, the user selects whether or not to store the image data as a secure job ("ON" 312 or "OFF" 313 in the diagram). The result of selection is stored in the flash ROM 102.

In this way, the user who has the administrative right can designate whether to store the image data as a secure job when archiving transmission of the image data has failed.

Figure 4:
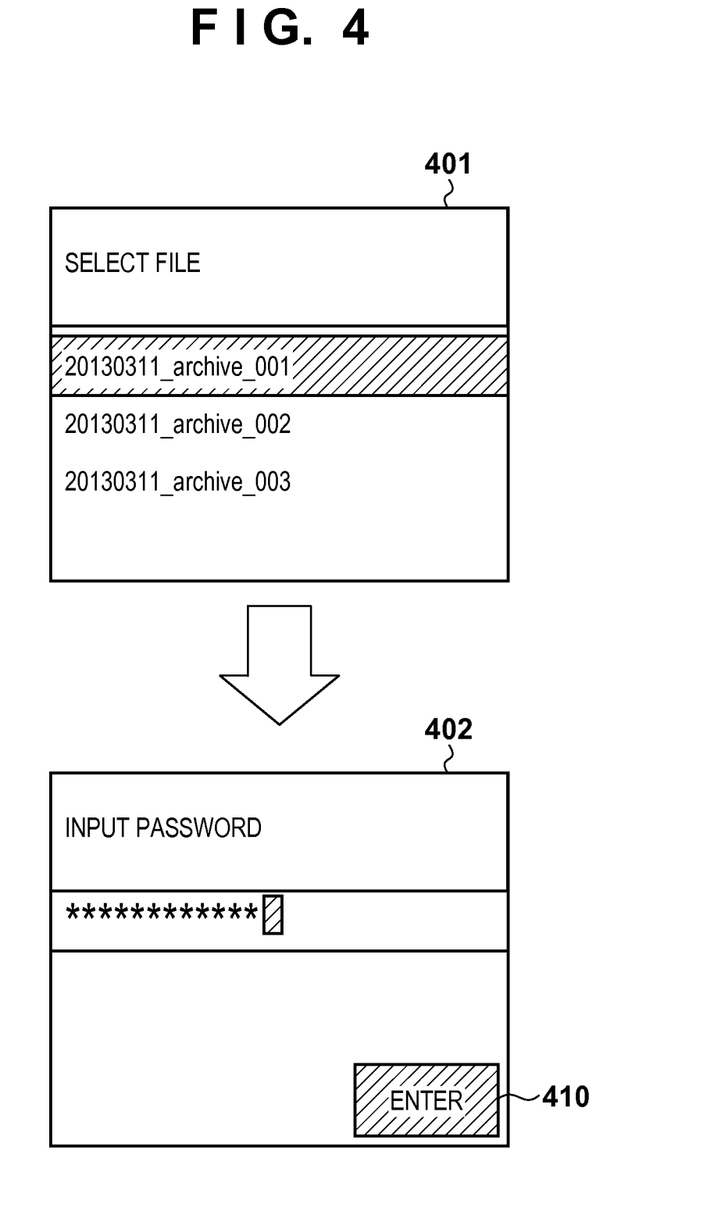
FIG. 4 is a diagram illustrating procedure for printing image data stored as a secure print job through archiving transmission according to Embodiment 1 of the present invention.

FIG. 4 is a diagram illustrating procedure for printing image data stored as a secure print job through archiving transmission according to Embodiment 1 of the present invention.

By the user pressing a "secure printing" button (not shown) of the console unit 106, an output file selection screen 401 shown in FIG. 4 is displayed. If the user selects a desired file on the output file selection screen 401, a password unlock screen 402 is displayed. If the user inputs the pre-set administrator password on the password unlock screen 402 and presses an enter button 410, the stored image data is printed.

As described above, according to Embodiment 1, even if archiving transmission of image data fails, the image data can be stored as archive data. Furthermore, the present embodiment has the effect that, even if archiving transmission fails, the image data can be stored as, for example a secure print job such that the image data can be output only by a specific user.

Embodiment 2

Next is a description of Embodiment 2 of the present invention. Embodiment 2 will be described taking an example in which, if archiving transmission of image data fails, the image data is stored in a folder in which the access right has been set, instead of storing the image data as a secure print job. An image communication apparatus 100 according to Embodiment 2 basically has the same hardware configuration as that of Embodiment 1, and thus a description thereof is not given here.

Figure 5:
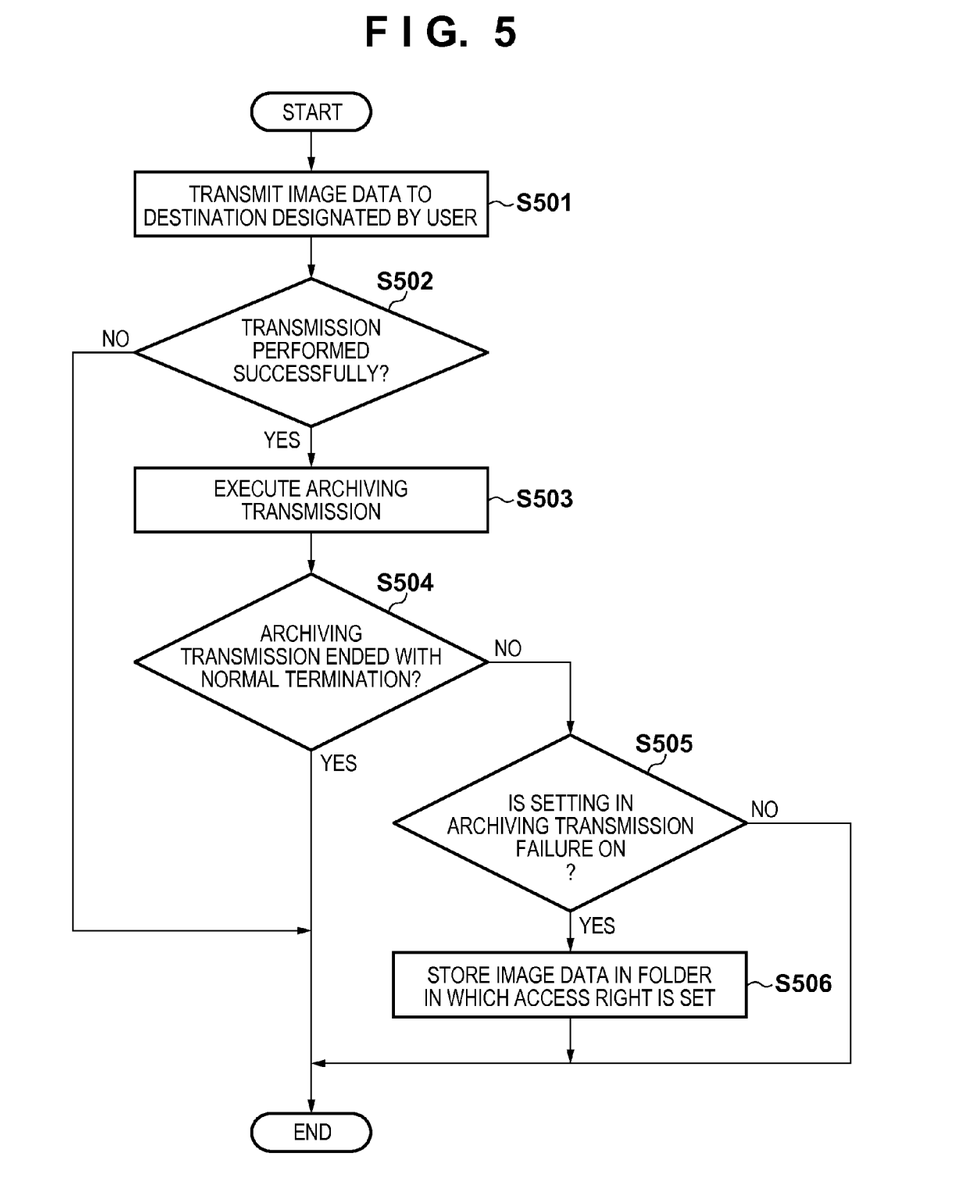
FIG. 5 is a flowchart illustrating processing for storing an archive transmission job performed by an image communication apparatus according to Embodiment 2 of the present invention.

FIG. 5 is a flowchart illustrating processing for storing an archive transmission job performed by the image communication apparatus 100 according to Embodiment 2 of the present invention. A program that executes this processing is stored in the ROM 102, loaded into the RAM 103 when executing the program, and executed under control of the CPU 101.

In FIG. 5, the processing performed in steps S501 to S504 is the same as that performed in steps S201 to S204 shown in FIG. 2 described above, and thus a description thereof is not given here.

If the CPU 101 determines in S504 that the archiving transmission failed, the procedure advances to S505, where the CPU 101 determines the next operation in accordance with the setting in archiving transmission failure. In S505, the CPU 101 determines whether the setting in archiving transmission failure is on. If it is determined that the setting in archiving transmission failure is on, the procedure advances to S506 where the image data is stored in a folder in which the access right has been set, and this processing ends.

Figure 6:
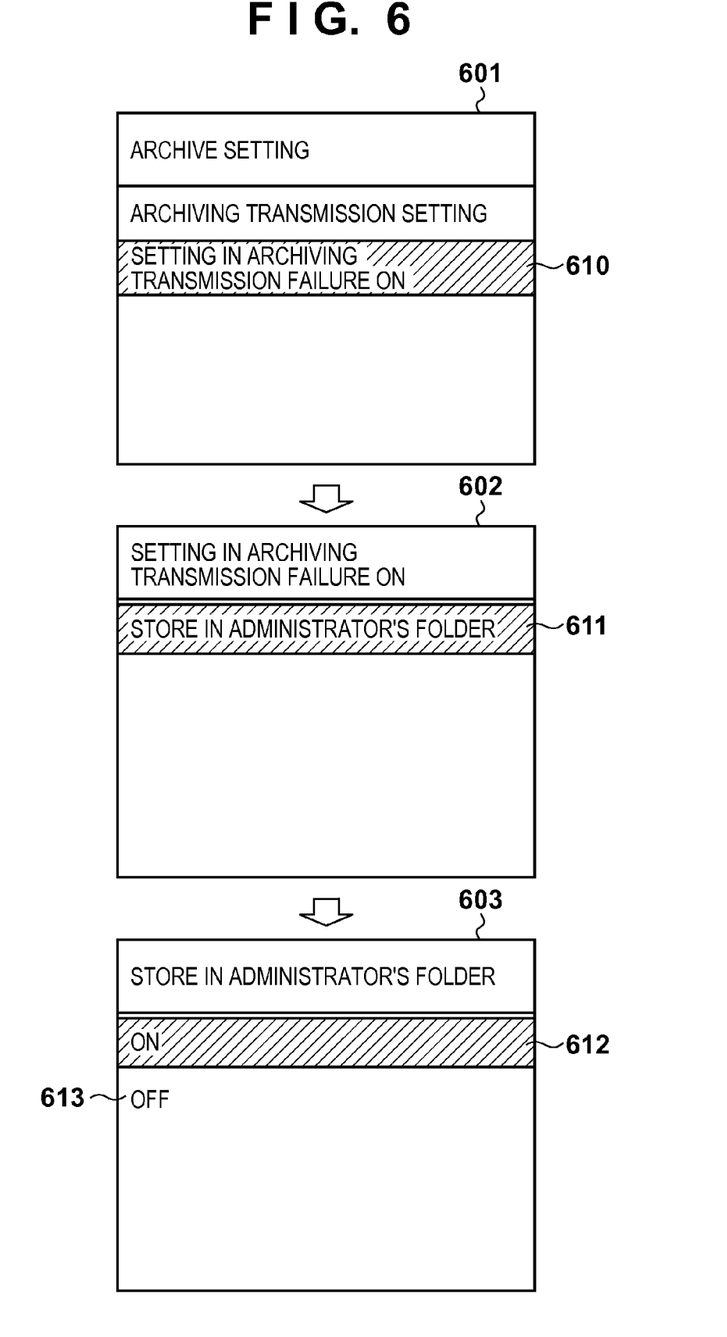
FIG. 6 is a diagram showing examples of screens displayed when a setting is made to store image data that has undergone archiving transmission in a dedicated folder for administrator according to Embodiment 2 of the present invention.

FIG. 6 is a diagram showing examples of screens displayed when a setting is made to store image data that has undergone archiving transmission in a dedicated folder for administrator according to Embodiment 2 of the present invention.

On an archive setting screen 601, the user selects "setting in archiving transmission failure" 610. Upon selection of the item, the screen transitions to a screen 602 for making a setting in archiving transmission failure, and the user selects "store in administrator's folder" 611. In response thereto, the screen transitions to a screen 603 for making a setting to store the image data in the administrator's folder. If the user selects "ON" 612 so as to store the image data in the administrator's folder, the image data is stored in the administrator's folder. If the user selects "OFF" 613, the image data is not stored in the administrator's folder.

As described above, according to Embodiment 2, if archiving transmission fails, a setting can be made to store the image data in the dedicated folder for administrator.

Figure 7:
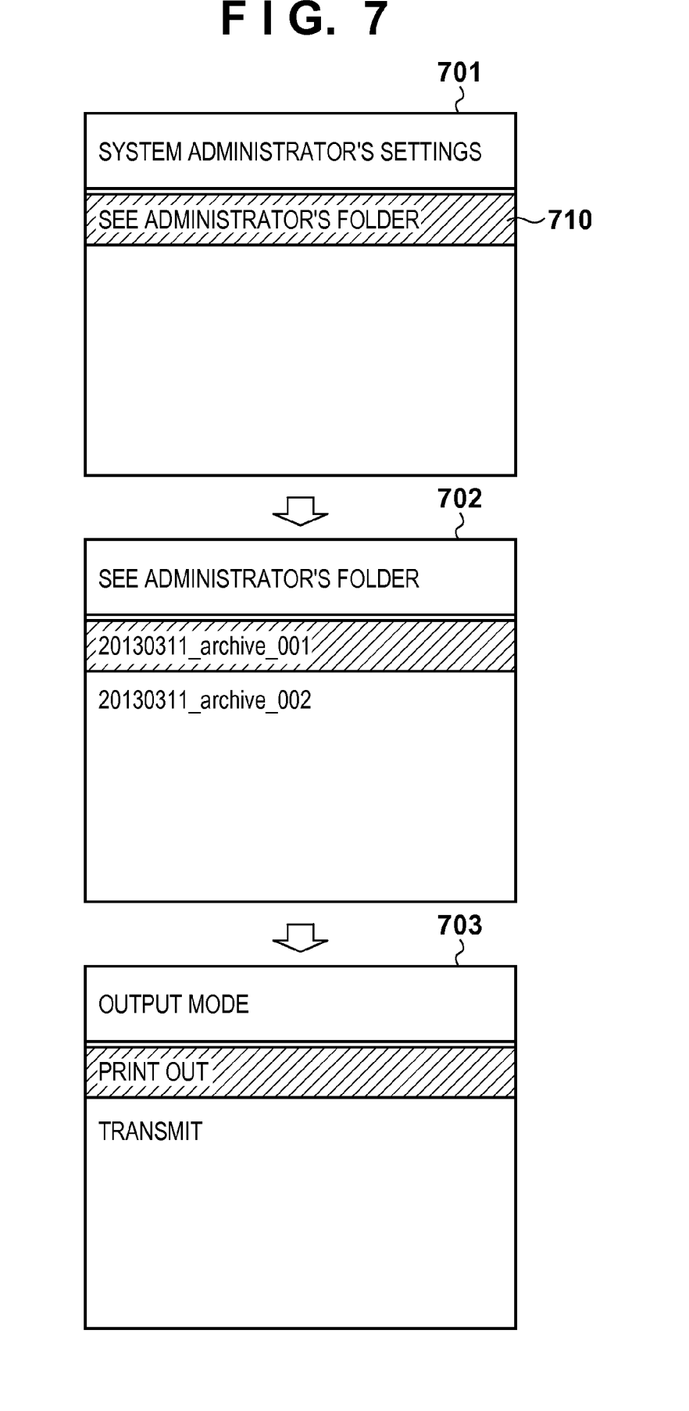
FIG. 7 is a diagram illustrating an example showing how output of the image data that has undergone archiving transmission and been stored in the administrator's folder is designated according to Embodiment 2 of the present invention.

FIG. 7 is a diagram illustrating an example showing how output of the image data that has undergone archiving transmission and been stored in the administrator's folder is designated according to Embodiment 2 of the present invention.

A screen 701 is a screen transitioned from a "system administrator's settings" screen in which access is restricted by the administrator ID and password, and thus only the user who has the administrative right can operate this screen. If the user selects "see administrator's folder" 710 on the screen 701, the screen transitions to a screen 702. On the screen 702, a list of files stored in the dedicated folder for administrator in the image communication apparatus 100 is displayed. Upon selection of a desired file on the screen 702 by the user, the screen transitions to a screen 703 for selecting an output mode of the file. If the user selects an output mode on the screen 703, output processing is performed based on the selected output mode. In FIG. 7, "print out" has been selected as the output mode. If "transmit" is selected, the transmission destination is a pre-set email address of the administrator. The transmission job is to transmit archive data, and thus further transmission of archive data by the transmission job does not occur.

As described above, according to Embodiment 2, the image data that failed in archiving transmission is stored in the dedicated folder for administrator, and it is therefore possible to omit the operations of inputting a password for each file as in Embodiment 1. This improves the usability for the administrator.

Embodiment 3

Embodiments 1 and 2 given above have been described taking an example in which if archiving transmission fails, the image data is stored in the image communication apparatus 100. In Embodiment 3, an example will be described in which the order of performance of archiving transmission and transmission to user's designated destination is switched based on the setting in archiving transmission failure and whether the archiving transmission has ended in success or failure. An image communication apparatus 100 according to Embodiment 3 basically has the same hardware configuration as that of Embodiment 1, and thus a description thereof is not given here.

Figure 8:
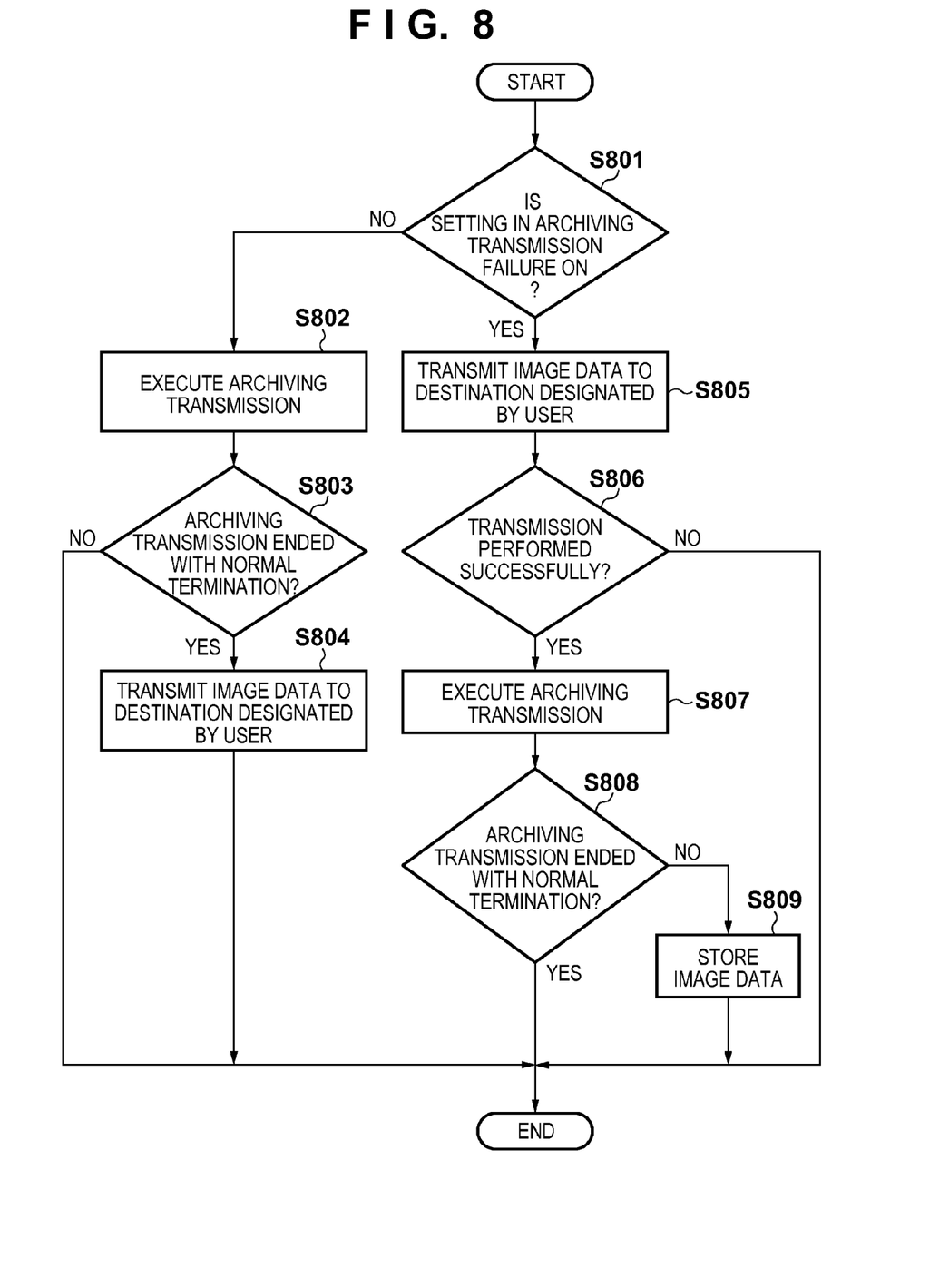
FIG. 8 is a flowchart illustrating processing performed by an image communication apparatus according to Embodiment 3 of the present invention.

FIG. 8 is a flowchart illustrating processing performed by the image communication apparatus 100 according to Embodiment 3 of the present invention. A program that executes this processing is stored in the ROM 102, loaded into the RAM 103 when executing the program, and executed under control of the CPU 101.

First, in S801, the CPU 101 determines whether the setting in archiving transmission failure is on. If it is determined that the setting in archiving transmission failure is on, the procedure advances to S805, where the CPU 101 transmits the image data to a destination designated by the user. In S806, the CPU 101 determines whether or not the image data has been transmitted successfully. If it is determined that the transmission of the image data failed, the processing ends. If, on the other hand, it is determined in S806 that the image data has been transmitted successfully, the procedure advances to S807, where the CPU 101 executes archiving transmission. Then, the procedure advances to S808, where the CPU 101 determines whether or not the archiving transmission ended with normal termination. If it is determined that the archiving transmission ended with normal termination, the processing ends. If, on the other hand, it is determined that the archiving transmission did not end with normal termination, the procedure advances to S809, where the CPU 101 stores the image data in the flash ROM 102, and the processing ends.

In S801, if the CPU 101 determines that the setting in archiving transmission failure is off, the procedure advances to S802, where the CPU 101 executes archiving transmission. Then, the procedure advances to S803, where the CPU 101 determines whether or not the archiving transmission ended with normal termination. If it is determined that the archiving transmission ended with normal termination, the procedure advances to S804, where the image data is transmitted to the destination designated by the user. If, on the other hand, it is determined in S803 that the archiving transmission failed, the processing ends.

As described above, according to Embodiment 3, it is possible to implement the archiving function having a high level of security without having to store image data in the image communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259505, filed Dec. 16, 2013, which is hereby incorporated by reference herein in its entirety.

What is claimed is:

1. An image communication apparatus comprising:
a designation unit constructed to designate a destination of image data;
a transmission unit constructed to transmit the image data to the destination designated by the designation unit;
a determination unit constructed to determine whether or not transmission by the transmission unit has been performed successfully;
an archiving unit constructed to, when it is determined that transmission by the transmission unit has been performed successfully, transmit the image data to an archiving destination; and
a storage unit constructed to, when archiving of the image data by the archiving unit fails, store the image data securely such that a user who has an administrative right can output the image data.

2. The image communication apparatus according to claim 1,
wherein the storage unit stores the image data as a secure print job, and
wherein an administrator password is set as an unlock password for the secure print job.

3. The image communication apparatus according to claim 1,
wherein the storage unit stores the image data in a folder in which an access right is set.

4. The image communication apparatus according to claim 1,
wherein the storage unit stores the image data securely such that the user who has the administrative right can output the image data.

5. The image communication apparatus according to claim 1, further comprising
a generation unit constructed to generate the image data.

6. An image communication apparatus comprising:
a designation unit constructed to designate a destination of image data;
a transmission unit constructed to transmit the image data to the destination designated by the designation unit;
a determination unit constructed to determine whether or not transmission by the transmission unit has been performed successfully;
an archiving unit constructed to, when it is determined that transmission by the transmission unit has been performed successfully, transmit the image data to an archiving destination; and
a setting unit constructed to configure a setting that is used when archiving of the image data by the archiving unit fails; and
a storage unit constructed to, when archiving of the image data by the archiving unit has failed and the setting has been configured by the setting unit, store the image data in accordance with the setting configured by the setting unit.

7. The image communication apparatus according to claim 6,
wherein the storage unit stores the image data as a secure print job, and
wherein an administrator password is set as an unlock password for the secure print job.

8. The image communication apparatus according to claim 6,
wherein the storage unit stores the image data in a folder in which an access right is set.

9. An image communication method comprising:
transmitting an image data to a designated destination;
determining whether or not the transmission of the image data to the designated destination has been performed successfully;
transmitting the image data to an archiving destination when it is determined that the transmission of the image data has been performed successfully; and
storing the image data securely such that a user who has an administrative right can output the image data, when the transmission of the image data to the archiving destination fails.

10. A non-transitory computer-readable medium storing a program to cause a computer to:
transmit an image data to a designated destination;
determine whether or not the transmission of the image data to the designated destination has been performed successfully;
transmit the image data to an archiving destination when it is determined that the transmission of the image data has been performed successfully; and store the image data securely such that a user who has an administrative right can output the image data, when the transmission of the image data to the archiving destination fails.

\* \* \* \* \*